United States Patent
Hofmans

(10) Patent No.: US 8,178,612 B2
(45) Date of Patent: May 15, 2012

(54) FLUOROPOLYMER EMULSION COATINGS

(75) Inventor: Jurgen Hofmans, Puurs (BE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 1727 days.

(21) Appl. No.: 11/039,549

(22) Filed: Jan. 19, 2005

(65) Prior Publication Data

US 2005/0191432 A1  Sep. 1, 2005

Related U.S. Application Data

(60) Provisional application No. 60/538,195, filed on Jan. 22, 2004.

(51) Int. Cl.
*C08L 27/12* (2006.01)

(52) U.S. Cl. ........ 524/544; 524/379; 524/545; 524/546; 524/801; 524/805; 508/130

(58) Field of Classification Search ................ 524/379, 524/520, 544; 508/130; 525/199, 200
See application file for complete search history.

(56) References Cited

U.S. PATENT DOCUMENTS

| | | | | |
|---|---|---|---|---|
| 3,389,013 A | * | 6/1968 | Armitage et al. | 428/204 |
| 3,914,511 A | * | 10/1975 | Vassiliades | 503/206 |
| 3,986,993 A | | 10/1976 | Vassiliou | |
| 4,127,491 A | * | 11/1978 | Reick | 508/130 |
| 4,287,112 A | | 9/1981 | Berghmans | |
| 4,400,487 A | * | 8/1983 | Stoneberg et al. | 525/199 |
| 4,425,448 A | | 1/1984 | Concannon et al. | |
| 4,715,972 A | * | 12/1987 | Pacholke | 508/111 |
| 5,240,562 A | * | 8/1993 | Phan et al. | 162/158 |
| 5,532,310 A | * | 7/1996 | Grenfell et al. | 524/463 |
| 6,153,688 A | * | 11/2000 | Miura et al. | 524/546 |
| 6,156,824 A | * | 12/2000 | Yamada et al. | 523/462 |
| 6,277,487 B1 | | 8/2001 | Soda et al. | |
| 6,413,915 B1 | * | 7/2002 | Stehr | 508/181 |
| 6,518,349 B1 | | 2/2003 | Felix et al. | |
| 6,592,977 B2 | | 7/2003 | Thomas et al. | |
| 2001/0020063 A1 | * | 9/2001 | Kapeliouchko et al. | 524/801 |

FOREIGN PATENT DOCUMENTS

| | | |
|---|---|---|
| EP | 1 016 466 A2 | 7/2000 |
| EP | 1 016 466 A3 | 2/2001 |
| WO | WO 83/04036 | 11/1983 |

* cited by examiner

*Primary Examiner* — Mark Eashoo
*Assistant Examiner* — Nicole M Buie-Hatcher

(57) ABSTRACT

The present invention relates to an aqueous/oil emulsion containing fluoropolymer that is capable of forming thick coatings in a single pass, which coatings after drying and baking are free of cracks.

6 Claims, No Drawings

FLUOROPOLYMER EMULSION COATINGS

FIELD OF THE INVENTION

This invention relates to fluoropolymer coating compositions in liquid form.

BACKGROUND OF THE INVENTION

Aqueous dispersions of fluoropolymers are well known in the art as being used for spray application to substrates, followed by drying and baking to form a non-stick coating on the substrate. Such dispersions typically have low viscosities, such as 100 centipoises (cps), to facilitate the spraying operation. Unfortunately, the resultant coating has a thickness limitation, which is that as the dry coating thickness approaches 12 μm, it cracks upon drying and baking, requiring that multiple thinner coats of the dispersion be applied, with intervening drying and baking, in order to build up the crack-free coating thickness desired, e.g., at least 30 μm to provide increased abrasion resistance. Thickeners that decompose and volatilize during baking of the fluoropolymer coating have been added to the aqueous dispersion, to increase the viscosity of the dispersion, with the goal of obtaining thicker one-pass coatings. One disadvantage of thickeners is that they are not approved for food contact in non-stick coating in many countries, notwithstanding the fact that they are designed to volatize during baking. However, as coating thickness increases volatilization is inhibited leaving decomposed thickener in the baked coating. Another disadvantage of thickeners is that they are not present in the baked composition, whereby they do not contribute to the properties of the resultant baked coating. U.S. Pat. No. 6,277,487 B1 discloses the use of such a thickener, which is a polyether, and its blending together with fluoropolymer fine particles, a polyether surfactant, and liquid carrier by stirring to form a uniform dispersion. According to the Examples, the composition has a viscosity of 250 to 280 cps (Brookfield Viscometer, #2 spindle (SP2), operating at 60 rpm) and is applied to a primed substrate by spraying.

There is a need for a thick fluoropolymer coating that can be formed by single-pass coating, without the use of temporary thickener additives, such as the polyether of U.S. Pat. No. 6,277,487, and wherein the coating has widespread governmental approval for food contact.

BRIEF SUMMARY OF THE INVENTION

The present invention satisfies this need by providing an aqueous/oil emulsion containing particles of fluoropolymer. This aqueous/oil emulsion composition is a true emulsion, i.e., the emulsion contains fine droplets of an immiscible liquid that are dispersed in another liquid. In the emulsion of the present invention, the oil is dispersed as fine droplets in water. In some literature, the term "emulsion" is mistakenly used to describe solid particles dispersed in a liquid medium. The emulsion of the present invention does contain fluoropolymer particles that are dispersed in the liquid media forming the emulsion, but the dispersion of oil droplets in the water phase has a profound effect on the viscosity of the composition, giving it the viscosity character of mayonnaise, e.g., having a preferred viscosity of at least about 2500 cps as measured using a Brookfield Viscometer, #3 spindle (SP3) operating at 20 rpm. This high viscosity keeps the fluoropolymer particles dispersed in the emulsion during storage and handling. This viscosity is too high for the use of spindle #2 (SP2) used to measure viscosity in U.S. Pat. No. 6,277,487. If the viscosity of the emulsion of the present invention were reduced by dilution with water to 1130 cps (SP3, 20 rpm), then it can be measured using spindle #2, which gives the viscosity reading of 620 cps at 60 rpm. In other words, the preferred emulsion of the present invention has a viscosity which is at least about 4× the viscosity of the compositions disclosed in this patent.

The emulsion (composition) of the present invention is not sprayable using conventional spray equipment because of the high viscosity of the emulsion. It has to be diluted to a lower viscosity, such as to 1500 cps or less before spraying, and this dilution is done by simply stirring in additional water shortly before spray application. Even the diluted, sprayable emulsion has a relatively high viscosity, referred to hereafter as application viscosity, such as at least about 500 cps, more preferably at least about 800 cps, up to about 1500 cps (SP3, 20 rpm) so that it is able to provide a single-pass, thick, crack-free fluoropolymer coating. The higher diluted viscosity of the emulsion is preferred as the coating thickness requirement increases, especially when vertical surfaces are to be coated.

The emulsion of the present invention is preferably free of any polymer thickener that tends to decompose and vaporize during baking of the coating formed from the composition, whereby there is no food contact problem; the fluoropolymer used in the emulsion of the present invention has widespread approval for use in food contact applications.

The present invention can also be defined as residing in the process of spray coating a substrate with an aqueous medium containing fluoropolymer particles, followed by drying and baking to form a release coating on said substrate, the improvement comprising carrying out said spraying in a single pass to obtain a crack-free thickness of at least 30 μm for said release coating, wherein said aqueous medium is an aqueous/oil emulsion.

DETAILED DESCRIPTION OF THE INVENTION

Examples of fluoropolymers that can be used in the emulsions of the present invention include polytetrafluoroethylene (PTFE) fine powder which has such a high melt viscosity that it has no appreciable flow at elevated temperature, whereby such polymer is not melt-fabricable. The PTFE can be a homopolymer or a modified homopolymer, wherein a small amount, e.g. less than 0.5 mol %, of another monomer is copolymerized with the tetrafluoroethylene (TFE) to improve properties, without imparting melt fabricability to the resin. Additional fluoropolymers include those that are melt-flowable, such as polychlorotrifluoroethylene, copolymers of tetrafluoroethylene (TFE) or chlorotrifluoroethylene (CTFE), such as copolymers of TFE with perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers, such as the TFE/perfluoro (methyl vinyl ether)/perfluoro (propyl vinyl ether) copolymer, sometimes called MFA by the manufacturer. Typically, it is a perfluoroolefin or PAVE monomer that is used to form the modified homopolymer described above. The melt-fabricable copolymer is made by incorporating a greater amount of the comonomer into the copolymer, e.g., to provide a copolymer which has a melt flow rate of about 1-100 g/10 min as measured according to ASTM D-1238 at the temperature which is standard for the resin. The foregoing mentioned fluoropolymers are perhalogented, and except for the CTFE-containing polymers are perfluoropolymers. Additional melt-fabricable fluoropolymers are the copolymers of ethylene with TFE or CTFE and polymers of polyvinylidene fluoride, including copolymers. All these copolymers contain at least 35 wt. % fluorine. The preferred fluoropolymer particles comprise tetrafluoroethylene/hexafluoropropylene copolymer, tetrafluoroethylene/perfluoro(alkyl vinyl ether) copolymer or polytetrafluoroethylene.

These fluoropolymers as used in the present invention are in the form of particles, having an average particle size of from less than 1 μm up to about 100 μm. Many of the fluoropolymers are made by aqueous dispersion polymerization, wherein the fluoropolymer particles as polymerized are typically in the range of 0.05 to 0.5 μm in diameter. The particle sizes disclosed herein are average particle sizes. These aqueous dispersions of fluoropolymers can be used to provide the water and fluoropolymer components of the emulsions of the present invention. The fluoropolymer component can also be present in large particle sizes, such as 20 to 100 μm, preferably 20 to 50 μm in diameter. Such large particle sizes can be made by coagulation from dispersion or by spray drying as described in U.S. Pat. No. 6,518,349 B1 (Felix et al.) with an optional grinding step to obtain particles of the desired size. The emulsions of the present invention can contain only the submicron size fluoropolymers, in which case the fluoropolymer will constitute generally from 10-90 wt %, preferably 20-60 wt % of the emulsion. The reference to wt % of the emulsion herein refers to the total weight of the wet composition. Alternatively, the emulsions of the present invention can contain only the large particles of fluoropolymer, in which case the fluoropolymer will generally constitute 10-70 wt % of the emulsion. Preferably, the emulsion contains fluoropolymer particles from both particle size groupings, e.g., 20-40 wt % of the submicron size particles (less than 1 μm or 0.05 to 0.5 μm) and together with 30 to 45 wt % of the larger size particles (20 to 100 μm or 20 to 50 μm).

The oil component of the emulsion is an aliphatic or aromatic hydrocarbon that is immiscible with water at room temperature (15-25° C.). Examples of hydrocarbon oil include but are not limited to trimethylbenzene, xylene, propylbenzene, isopropylbenzene, toluene and mixtures thereof.

The emulsion of the present invention is made by blending the oil into the water phase preferably already containing the fluoropolymer particles under conditions of high shear to distribute the oil into the water phase in the form of fine droplets. Preferably, an emulsifying agent for the oil is also added to the composition prior to shear blending to aid in the dispersion of the oil droplets in the water phase and to maintain the stability of the emulsion. Examples of emulsifying agent includes water soluble long-chain hydrocarbon alcohols, such as containing at least 8 carbon atoms, including dodecanol, octanol, decanol, and tetradecanol. The organic portion of the alcohol interacts with the oil and the —OH group of the alcohol is hydrophilic to enable it to interact with the water phase, to provide the emulsifying assist during the high-shear blending operation. The amount of oil in the emulsion of the present invention will be effective to increase the viscosity of the emulsion to at least about 2000 cps. The minimum amount of oil to accomplish this thickening will depend on the particular oil being used. Generally at least about 0.8 wt % based on the weight of the emulsion will accomplish this thickening. The desired extent of thickening will depend on the method of application to be employed as will be explained hereafter. Generally the amount of oil need not exceed about 5 wt % based on the weight of the emulsion. Typically no more than about 0.8 to about 1.5 wt % oil is required to achieve emulsion viscosities of about 2000 to about 3000 cps (SP3, 20 rpm), which is the preferred viscosity range prior to dilution to obtain sprayability. The amount of emulsifying agent will be that which is sufficient to cause the emulsification to occur during high-shear blending. Generally the amount of emulsifying agent to oil is in the weight ratio of about 0.2 to about 0.5:1. Preferably the amount of emulsifying agent is from about 0.4 to about 2.5 wt % based on the weight of the emulsion.

By high-shear blending it is meant that the speed and mixer configuration contribute to create a blending process such that an eddy (vortex, whirlpool) is produced. In the preferred process of forming the emulsion of this invention, a dispersion containing fluoropolymer particles, water, all other solvents, pigments and additives, with the exception of the oil and the emulsifying agent, are blended in a mixer at a speed of approximately 50 rpm. The speed of the mixing device is then adjusted from about 50 rpm to a higher speed of about 80 to about 100 rpm to form an eddy. A first portion of the hydrocarbon oil and emulsifying agent are added to the eddy. The mixer speed is then increased to from about 100 to about 120 rpm and the remainder of the oil and emulsifying agent is added. In a more preferred embodiment, the oil and the emulsifying agent are mixed together prior to addition to the fluoropolymer dispersion. The rpm of the mixing (shear) blade to accomplish the high-shear blending to create the emulsion will depend on the design of the mixing blade.

The dispersion of fluoropolymer particles in water, whether the fluoropolymer particles are submicron are larger, is generally formed prior to the addition of the hydrocarbon oil. In the case of the submicron particles of fluoropolymer, the particles are dispersed in the water polymerization medium as the particles are formed. Surfactant that does not interfere with the polymerization reaction is present to provide this dispersion of as-polymerized fluoropolymer particles in the water medium. Examples of such surfactant are the water soluble salts of long chain perfluoroaliphatic compounds, such as ammonium perfluorooctanoate. So that the dispersed particles of fluoropolymer do not coagulate during high shear blending, additional surfactant is added to the aqueous dispersion prior to the blending operation; this surfactant stabilizes the dispersion. A nonionic surfactant commonly used in dispersion processing is Triton® X-100, supplied by Dow Chemical. This surfactant is a form of octyl phenol ethoxylate. Another suitable surfactant for use in this invention is Tergitol® TMN-6 or Tergitol® TMN-10 or a mixture thereof, available from Dow Chemical Corporation. These are alcohol ethoxylates that differ only in the ethylene oxide content. The alcohol used to make this surfactant is 2,6,8-trimethyl-4-nananol, which is a branched secondary alcohol.

The amount of such surfactant that is needed will depend on the sensitivity of the dispersed fluoropolymer particles to coagulate upon being subjected to high shear. Thus tendency varies with the identity of the fluoropolymer, its particle size, and the amount of submicron-size particles of the fluoropolymer that is present. In the case of the large particles of fluoropolymer being present in the emulsion of the present invention, the particles are dispersed in the aqueous medium by stirring in the presence of the surfactant such as that used for stabilizing the dispersion of submicron particles described above.

The fluoropolymer particles in the aqueous medium prior to addition of the oil exhibits a viscosity of up to about 300 cps. Creation of the oil emulsion in the water phase increases the viscosity to be at least about 2000 cps, preferably at least about 2500 cps. For some applications, emulsions with viscosities as high as 10,000 cps can be achieved and are useful for dip coating compositions which are applied without dilution. At high viscosities, the dispersion of fluoropolymer particles whether submicron or larger is stable. Even though the fluoropolymer particles do not contribute much to the viscosity of the aqueous dispersion, they do contribute importantly to the viscosity of the emulsion. Thus, the concentration of fluoropolymer particles present in the composition along with the amount of hydrocarbon oil creating the emulsion phase are selected to obtain the high viscosity desired for the emulsion. As prepared, an emulsion of this invention will have a viscosity of at least about 2000 cps. High viscosity makes the product stable and prevents settling. The emulsion of this invention is stable for up to a year or more and is superior in stability to prior art fluoropolymer dispersions which are maintain stability for approximately 3-6 months.

Coating Application

The emulsion of the present invention can be applied to substrates to form thick crack-free coatings by conventional means. Spray and roller application are the most convenient application methods, depending on the substrate being coated. Other well-known coating methods including dipping and coil coating are suitable. The non-stick coating emulsion compositions may be applied as a single coat or as a multiple number of coats. The dried film thickness, DFT, of a single coat will be typically at least 35 μm, preferably at least 40 μm, and more preferably at least about 50 μm. Generally the maximum crack-free single pass coating thickness is about 60 μm. With the emulsions of this invention it is possible to apply a number of coating layers to reach thicknesses of greater than 100 μm, preferably greater than 300 μm and even as high as 1 mm for applications such as in the chemical processing industry where thick coatings are desired. By using multiple layers of this emulsion coating composition to build thick coatings free of thickening agents, the possibility of partially decomposed thickening agent which has not completely volatized is eliminated.

The emulsion coating composition of the present invention can be applied to any number of substrates which can withstand the bake temperature, such as metal and ceramics, examples of which include aluminum, anodized aluminum, cold-rolled steel, stainless steel, enamel, glass, and pyroceram.

When it is desirable to apply the emulsion by spray coating, the emulsion is diluted with water just prior to spraying to the viscosity desired for the crack-free coating thickness desired. Typically such application viscosity will be no greater than about 1500 cps, typically in the range of about 800 to about 1500 cps, and will typically be no less than about 500 cps. Preferably the crack-free thickness after drying and baking of a one-pass coating will be at least 35 μm and more preferably at least 40 μm.

TEST METHODS

Viscosity

Viscosities disclosed herein are determined by using a Brookfield SyncroLectric Viscometer, model DV II+, with a #3 spindle operating at 20 rpm after 2 minutes of continuous rotation at 25° C., unless otherwise specified. The instrument measures the viscosity in terms of torque produced upon a spindle rotating at a definite constant speed while immersed in the material under test.

Taber Abrasion Test

An abrasion test is conducted generally according to ASTM D4060 wherein the surface of a film is subjected to the wear of two abrasive wheels at a known load. The weight loss and the DFT loss are a measure of the resistance of a film to abrasion and is determined after a specified number of cycles. The apparatus used is a Taber Abrasion Model 503, from the Taber Instrument Company. All Taber testing is done with CS17 abrasive wheels/1 kg load/1000 cycles except where noted differently. The wheels are cleaned to refresh the abrasive surface every 250 cycles.

Scotch-Brite® Abrasion Resistance

The Scotch-Brite® abrasion resistance test is based on the British Standard Specification for cookware BS 7069 1988. Coating breakthrough is the final point of this test. The breakthrough pattern is compared to a reference picture. Since the pattern can differ depending on the type of substrate, it is recommended for strict coating comparison, to use same substrate for different samples. Cycles are run until breakthrough and are reported per micron, to overcome variances in DFT.

Critical Cracking Test Procedure (CCT):

The CCT test procedure used in the examples is a procedure to test the maximum film thickness that can be obtained by coating a composition on a substrate prior to film cracking. Coating composition is applied to a smooth aluminum panel that is cleaned but not grit blasted. A primer (10-12 micrometers DFT) is applied to the surface of the panel. The primer layer is dried for 5 minutes at 105° C. followed by baking at 380° C. for 20 minutes. The overcoat being tested is applied in a wedge shaped pattern such that a coating having a thickness of 10 micrometers (DFT) is applied to one end of a horizontally disposed panel increasing the thickness of the coating in 5-10 micrometer increments along the panel until the opposite end of the panel has a coating thickness of 60-70 micrometers. The buildup of increments is obtained by respraying wet-on-wet an increasing number of times yielding the thickness desired from one end of the panel to the other. The coated substrate after all increments are applied is dried for 5 minutes at 105° C., subjected to baking for 20 minutes at 380° C. and, optionally subjected to an extended bake at 330-340° C. for 3 hours. The fully baked coating film is evaluated through a microscope with 10× magnification to determine regions of cracking. The regions of cracking are measured with a Fisher Dualscope MP4C measuring device to determine the DFT.

EXAMPLES

Fluoropolymers

FEP dispersion 1: TFE/HFP fluoropolymer resin dispersion in water containing 3.2-4.04% HFP and a melt flow rate of 8.9-13.3 g/10 min measured at 372° C. by the method of ASTM D-1238, weight % solids 54.50-56.50% and RDPS of from 150 nanometers-210 nanometers. Raw dispersion particle size (RDPS) is measured by photon correlation spectroscopy.

FEP dispersion 2: TFE/HFP fluoropolymer resin dispersion in water containing 9.8-12.4% HFP and a melt flow rate of 5.3-13.3 g/10 min measured at 372° C. by the method of ASTM D-1238, weight % solids 53.00-56.00% and RDPS of from 150 nanometers-210 nanometers. Raw dispersion particle size (RDPS) is measured by photon correlation spectroscopy.

FEP powder 1: TFE/HFP fluoropolymer powder containing 10.3-13.2% HFP, a particle size around 10 micron and a melt flow rate of 2.95-13.3 g/10 min measured at 372° C. by the method of ASTM D-1238. Average particle size of powder particles was measured by laser light scattering on dry particles, (using the Microtrac 101 Laser Particle Counter, available from Leeds & Northrup, a division of Honeywell Corporation).

FEP powder 2: TFE/HFP fluoropolymer powder containing 10.3-13.2% HFP, a particle size in the range of 28.9-45.7 micron and a melt flow rate of 2.95-13.3 g/10 min measured at 372° C. by the method of ASTM D-1238, unpacked bulk density 55-87 g/100 cc.

Polymer Binder

PAI is a 36 wt % solution of PAI resin in an NMP-based solvent containing naptha and butyl alcohol in ratio NMP/naptha/alcohol=40.5/21.5/2.0 (grade PD-10629, Phelps-Dodge Magnet Wire Co.).

PES resin is Ultrason E 2020P polyethersulfone granules purchased from BASF.

In the following Examples, substrates of aluminum sheet are cleaned and grit blasted with a ⁵⁰⁄₅₀ mixture of 60 and 80 mesh grit aluminum oxide using 5-6 bar pressure to a roughness of approximately 3-5 microns Ra.

The primer layers formed in the Examples have the following pre-bake compositions:

TABLE 2

| Primers | Primer 1 Green | Primer 2 Blue |
|---|---|---|
| Polymer binders | | |
| PAI resin | 2.83 | 2.70 |
| PES resin | 6.87 | 6.57 |
| Butylated melamine formaldehyde resin | 0.20 | 0.20 |
| Fluoropolymer | | |
| FEP powder 1 | 11.25 | 10.76 |
| Solvents | | |
| N-methyl-2-pyrrolidone | 48.95 | 48.60 |
| Other organics* | 19.19 | 17.31 |
| Pigments | | |
| Chromium (III) oxide | 2.82 | |
| Ultramarine blue | | 4.83 |
| Barium sulphate | 6.58 | 7.67 |
| Other additives** | 1.31 | 1.36 |
| Total | 100 | 100 |

*other organics may include diacetone alcohol, methyl isobutyl alcohol, heavy nafta, isobutyl alcohol, etc or mixtures thereof.
**other additives include dispersing agents as Triton X-100 and/or flow agent as polyacrylic resin The overcoat layers formed in the Examples have the following pre-bake compositions:

TABLE 3

| Overcoats | Overcoat 1 | Overcoat 2 | Overcoat 3 | Overcoat 4 |
|---|---|---|---|---|
| Fluoropolymer | | | | |
| FEP dispersion 1 | 83.14 | 70.23 | 70.18 | |
| FEP dispersion 2 | | | | 23.34 |
| FEP powder 2 | | | | 28.00 |

TABLE 3-continued

| Overcoats | Overcoat 1 | Overcoat 2 | Overcoat 3 | Overcoat 4 |
|---|---|---|---|---|
| Solvents | | | | |
| Glycerine | 7.69 | 6.35 | 6.35 | 4.66 |
| Xylene | 7.83 | 7.54 | 7.53 | |
| Other organics | | | | 0.40 |
| Water | | 5.99 | 7.65 | 35.20 |
| Dispersing agent | | | | |
| Triton | 1.34 | 3.00 | 3.10 | 4.00 |
| Surfynol | | | | 2.80 |
| Sodium naphthalene sulfonate | | 0.07 | 0.04 | |
| Pigments | | | | |
| Chromium (III) oxide | | 6.82 | | |
| Cobalt blue | | | 5.12 | |
| Carbon black | | | 0.03 | |
| Emulsifier | | | | |
| 1-dodecanol | | | | 0.53 |
| Aromatic Hydrocarbon* oil | | | | 1.07 |
| Total | 100 | 100 | 100 | 100 |

*Solvesso 100 (from ExxonMobil, Esso or Shell), hydrocarbon fraction containing >50% nafta (slightly aromatic), +/−34% 1,2,4 trimethyl benzene and with xylene, mesitylene, propylbenzene and isopropylbenzene.

Comparative Example A

To prepare a coated substrate having a green color, a layer of green primer 1 (10-15 micrometers DFT) is applied to a grit blast (as described above) aluminum panel and dried for 10 minutes at 250° C. A layer of green overcoat 2 is then applied (10-12 micrometers) and dried for 5 minutes at 105° C. followed by baking at 380° C. for 20 minutes. A second layer of green overcoat 2 (10-12 micrometers DFT) is applied and dried for 5 minutes at 105° C. followed by baking at 380° C. for 20 minutes. A layer of clear overcoat 1 (10-12 micrometers) is then applied as a topcoat and dried for 5 minutes at 105° C. followed by baking at 380° C. for 20 minutes. The coated substrate is then subjected to an extended bake at 330-340° C. for 3 hours. The total dry film thickness (DFT) of the coating is 40-50 micrometers. The coatings are applied using a DeVilbiss spray gun, model JGA with a 1.4 mm nozzle at a pressure of 3 bar.

Prior to application, the viscosities of the overcoats are determined using a #2 spindle operating at 20 rpm as described above. The viscosity of overcoat 1 is 150 cps. The viscosity of overcoat 2 is 200 cps.

The coated panel is subjected to the Taber abrasion test and the SBAR test as described above in the Test Methods section.

The Taber abrasion is determined to be 57.3 mg. SBAR results are 90 cycles per micron.

Overcoat 1 and Overcoat 2 are each subjected to the Critical Cracking test as described in the Test Methods section. The CCT for both overcoats used in this system is 10-15 micrometers.

Comparative Example B

To prepare a coated substrate having a blue color, the same procedure as described in Comparative Example A is followed with the exception that the primer used is blue primer 2 and two layers of blue overcoat 3 are used instead of overcoat 2. Just as in Comparative Example A, a layer of clear overcoat 1 is applied as the topcoat.

Prior to application, the viscosities of the overcoats are determined using a 2 spindle operating at 20 rpm as described above. The viscosity of overcoat 3 is 200 cps.

The coated panel is subjected to the Taber abrasion test and the SBAR test. Overcoat 3 is analyzed for Critical Cracking Thickness.

The results of Taber abrasion, SBAR and CCT are approximately the same as those reported for Comparative Example A.

Example 1

To prepare overcoat 4 which is the subject emulsion of the present invention, all of the ingredients for the overcoat, as listed in Table 3 with the exception of the dodecanol and aromatic hydrocarbon, are combined in a mixing tank (1390× 1100 mm). Within the tank are A320 propellers supplied by Mervers so that ratio of propeller to tank diameter is 0.44. The speed of the mixing device is adjusted 80-100 rpm to create an eddy. The dodecanol and aromatic hydrocarbon are mixed together separately and then approximately half of the total amount is added slowly to the eddy. The mixer speed is increased to 100-120 rpm and the remaining amount of dodecanol and aromatic hydrocarbon mixture is added. Viscosity rises from 400-500 cps to 2500 cps in about 5 to 10 minutes after the start of the addition of the dodecanol and aromatic hydrocarbon mixture. At this high viscosity the product is stable for up to one year and settling is prevented. For application, the emulsion is reduced to 1100-1200 cps (SP3, 20 RPM) by a reduction with 10-12% water.

To prepare a coated substrate having a green color, a layer of green primer 1 (10-15 micrometers DFT) is applied to a grit blast (as described above) aluminum panel and dried for 10 minutes at 250° C. A layer of overcoat 4 is then applied (30-40 micrometers) and dried for 5 minutes at 105° C. followed by baking at 380° C. for 20 minutes. The coated substrate is then subjected to an extended bake at 330-340° C. for 3 hours. The total dry film thickness (DFT) of the coating is 40-50 micrometers with only one overcoat layer being applied. The primer coating is applied using a DeVilbiss spray gun, model JGA with a 1.4 mm nozzle at a pressure of 3 bar. The overcoat 4 is applied using a Kremlin low pressure spray gun, model M21G with a 1.8 mm nozzle at a pressure of 1-2 bar.

The coated panel is subjected to the Taber abrasion test and the SBAR test. Overcoat 4 is analyzed for Critical Cracking Thickness as described above in the Test Methods section.

The Taber abrasion is determined to be 13.5 mg. SBAR results are 115 cycles/micron. The CCT for overcoat 4 of this system is greater than 50 micrometers in that no real cracking is observed.

The green primer provides a green color to the overall coating visible through overcoat 4. Alternatively, pigment can be added to overcoat 4 and the same results are obtained.

The abrasion resistance and critical cracking thickness of this system is far improved over the prior art compositions described in Comparative Examples A and B. Adhesion, gloss, and baking performance are all excellent for use in nonstick-coated bakeware.

Example 2

To prepare a coated substrate having a blue color, the same procedure as described in Example 1 is followed with the exception that the primer used is blue primer 2. Just as in Example 1, a thick layer of overcoat 4 (DFT 40-50 micrometers) is applied as the topcoat.

The results of Taber abrasion, SBAR and CCT are approximately the same as those reported for Example 1.

What is claimed is:

1. An aqueous and oil emulsion containing particles of fluoropolymer, wherein said fluoropolymer comprises 10-90 wt% of the emulsion and wherein said fluoropolymer particles comprise a first group of particles having an average particle size of less than 1 micrometer and a second group of particles having an average particle size of 20-100 micrometers, and wherein the oil component of the emulsion is an aliphatic or aromatic hydrocarbon that is immiscible with water at room temperature, 15-25° C., and the oil does not exceed 5 weight % based on the weight of the emulsion, and further wherein the emulsion has a viscosity of at least 2000 centipoises.

2. The emulsion of claim 1 wherein said fluoropolymer particles comprise tetrafluoroethylene/hexafluoropropylene copolymer, tetrafluoroethylene/perfluoro(alkyl vinyl ether) copolymer or polytetrafluoroethylene.

3. The emulsion of claim 1 wherein said oil is aromatic hydrocarbon oil.

4. The emulsion of claim 1 containing emulsifying agent.

5. The emulsion of claim 4 wherein said emulsifying agent is an aliphatic hydrocarbon alcohol containing at least 8 carbon atoms.

6. An aqueous and oil emulsion containing particles of fluoropolymer and an emulsifying agent, wherein said fluoropolymer comprises 10-90 wt% of the emulsion, said emulsifying agent is an aliphatic hydrocarbon alcohol containing at least 8 carbon atoms, and said emulsion has a viscosity of at least 2000 centipoises, and further wherein the oil component of the emulsion is an aliphatic or aromatic hydrocarbon that is immiscible with water at room temperature, 15-25° C., and the oil does not exceed 5 weight % based on the weight of the emulsion.

* * * * *